UNITED STATES PATENT OFFICE.

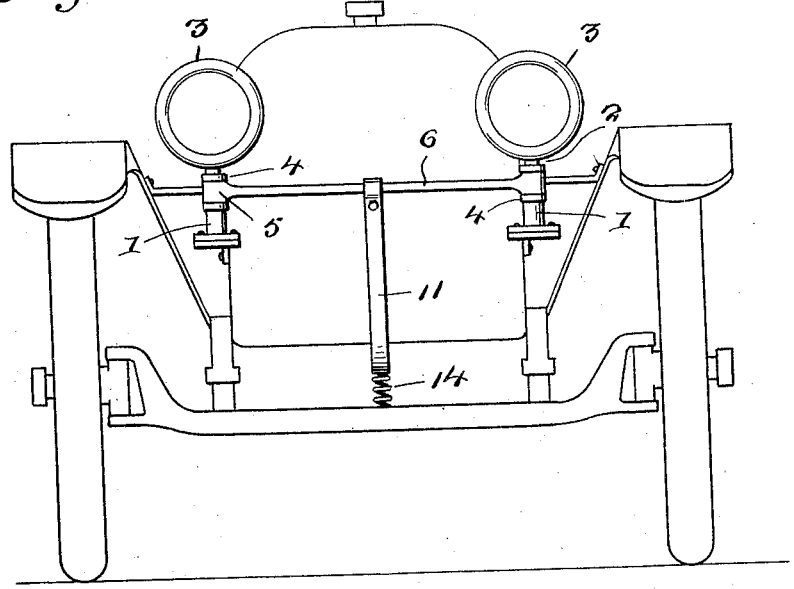
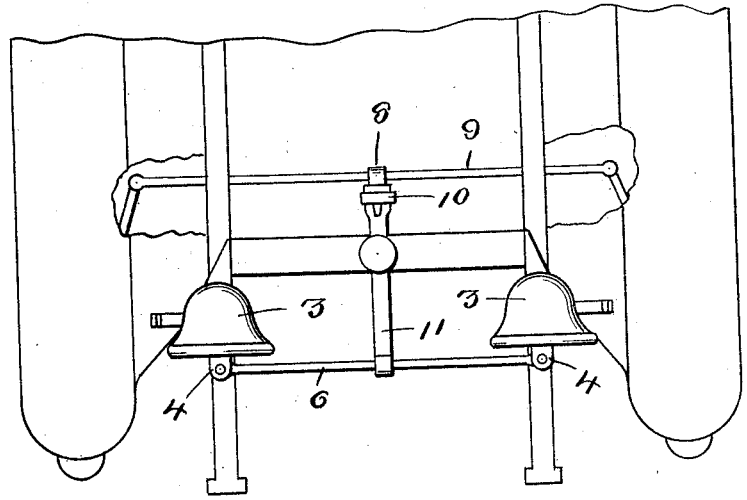

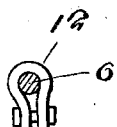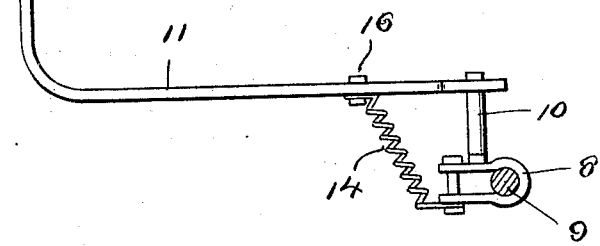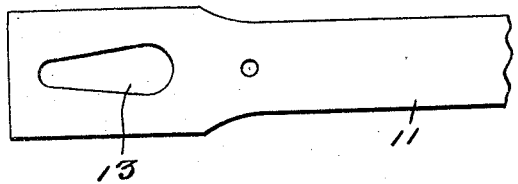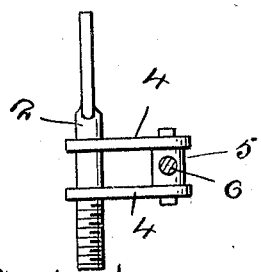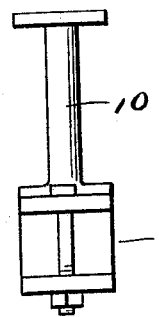

ROBERT E. DAVIS, OF EL PASO, TEXAS.

DIRIGIBLE HEADLIGHT.

1,389,493.  Specification of Letters Patent.  Patented Aug. 30, 1921.

Application filed August 21, 1920. Serial No. 405,073.

*To all whom it may concern:*

Be it known that I, ROBERT E. DAVIS, a citizen of the United States, residing at El Paso, in the county of El Paso and State of Texas, have invented new and useful Improvements in Dirigible Headlights, of which the following is a specification.

This invention relates to improvements in dirigible headlights for automobiles and the like, the principal object of the invention being to provide simple and effective means for connecting the head lamps with the connecting rod of the steering mechanism of the automobile.

Another object of the invention is to provide means for so connecting the parts that the car may pass over rough roads without imparting the irregular movement of the running gear to the lamps.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic front view of an automobile supplied with my invention.

Fig. 2 is a diagrammatic plan view thereof.

Fig. 3 is an enlarged edge view of the connecting means.

Figs. 4, 5, 6 and 7 are detail views.

In these views 1 indicates a pair of lamp supporting post sockets which have their lower ends secured in any desired manner to a suitable part at the front of the automobile. Each socket is interiorly screw threaded to receive the screw threaded lower end of the lamp posts 2. The lamps 3 are secured to the upper forked ends of the posts 2 in the ordinary manner. Each post is provided with the ears 4 which receive between them the offset ends 5 of the connecting rod 6 which connects the two posts together and extends across the radiator of the automobile. The ends of this rod are pivotally connected with the ears.

A U-shaped clip 8 is clamped on the connecting rod 9, which forms part of the steering mechanism of the car, and this clip carries the upright post 10 which is provided with an enlarged head at its upper end. A substantially L-shaped rod 11 has an eye 12 formed at its upper end to be bolted to the cross rod 6 and its other end is provided with a tapered elongated slot 13 to receive the post 10. A coiled spring 14 has one end connected with the horizontal part of the rod 11 by the bolt 16 and the other end of the spring is connected with the clip.

It will thus be seen that when the steering mechanism of the car is manipulated the longitudinal movement of the connecting rod 9 will be transmitted to the cross rod 6 by means of the L-shaped rod 11 and the clip and its post so that said rod 6 will rotate the lamp posts in their sockets and thus cause the head lamps to move with the front wheels so that the rays of light will follow the turn in the road. The screw threaded connection between the posts and their sockets will permit the free turning movement of the posts but will prevent the withdrawal of the posts from the sockets.

The connection of the L-shaped rod 11 with the connecting rod 9 by means of the post and slot will prevent flickering of the lights due to the irregular movements of the steering gear passing over rough roads being transmitted to the parts attached to the lamps as the said post 10 will move freely through the slot 13 without transmitting the jars and jolts through the rod 11 and the parts attached thereto.

If the vertical part of the rod 11 is in the way of the starting crank the parts can be adjusted so that this rod can be moved into another position away from the center of the automobile and out of the way of the crank.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with an automobile and its headlamps, a post for each lamp having a screw threaded lower end, a screw threaded socket for receiving said screw threaded end of each post, ears on each post, a cross rod pivotally connected with the ears for connecting the posts together, an L-shaped rod having its upper end connected with the cross rod and having an elongated tapered slot in its other end, a clip adjustably carried by the connecting rod of the steering mechanism, a post on the clip engaging the slot and a spring connecting the clip with the L-shaped rod.

2. In combination with an automobile and its headlamps, of posts supporting the headlamps, a socket for rotatably supporting the post, each socket being screw threaded to receive the screw threaded lower end of the lamp posts, a U-shaped clip clamped on the connecting rod, an upright post carried by said clip and having an enlarged head at its upper end, an L-shaped rod having an eye formed at its upper end and connected to the cross rod and its other end having a tapered elongated slot to receive the upright post, a spring connecting said clip with the L-shaped rod adjacent its slotted end.

In testimony whereof I affix my signature.

ROBERT E. DAVIS.